United States Patent [19]

McKeon et al.

[11] Patent Number: 4,774,979

[45] Date of Patent: Oct. 4, 1988

[54] PIVOTABLE OVERHEAD CONDUIT ASSEMBLY

[75] Inventors: Francis J. McKeon, Garden City, N.Y.; William E. Connelly, Demarest, N.J.

[73] Assignee: Castle Coal & Oil Co., Inc., Bronx, N.Y.

[21] Appl. No.: 81,057

[22] Filed: Aug. 3, 1987

[51] Int. Cl.[4] .......................... A01M 7/00; A01G 25/09

[52] U.S. Cl. .......................... 137/351; 137/615; 137/899; 141/387; 141/388; 285/404

[58] Field of Search ............... 137/344, 349, 350, 351, 137/354, 355, 615, 899; 141/387, 388; 285/404

[56] References Cited

U.S. PATENT DOCUMENTS

| | | | |
|---|---|---|---|
| 2,069,428 | 2/1937 | Tobiason | 137/247.51 |
| 2,793,909 | 5/1957 | Gerbracht | 137/899 |
| 3,381,711 | 5/1968 | Fye | 137/615 |
| 3,685,543 | 8/1972 | Schwing | 137/351 X |
| 3,789,869 | 2/1974 | Morris | 137/351 |
| 3,807,676 | 4/1974 | Bieker | 137/899 |
| 3,989,065 | 11/1976 | McTighe | 137/615 |
| 4,031,914 | 6/1977 | Neri | 137/247.51 |
| 4,205,699 | 6/1980 | Brekke | 137/615 |
| 4,213,479 | 7/1980 | Pearson | 137/351 X |
| 4,430,028 | 2/1984 | Clayton | 137/615 X |
| 4,525,277 | 6/1985 | Poulin | 137/351 X |
| 4,549,751 | 10/1985 | Grove | 285/404 X |

*Primary Examiner*—A. Michael Chambers
*Attorney, Agent, or Firm*—Pennie & Edmonds

[57] ABSTRACT

An overhead apparatus for transferring a fluid medium between a first moveable location and a second fixed location which comprises a container for a fluid medium; a conduit assembly for selectively communicating the container with a location spaced therefrom; a conduit support assembly adjacent to the container for pivotally supporting at least a portion of the conduit at a location above ground level to provide selective fluid medium communication between the container and the location spaced therefrom, such that a fluid medium may be transferred therebetween while permitting the unimpeded passage of traffic thereunder and whereby at least a portion of the conduit assembly may be pivotally rotated between a first storage position and a second operating position.

21 Claims, 2 Drawing Sheets

FIG. 1
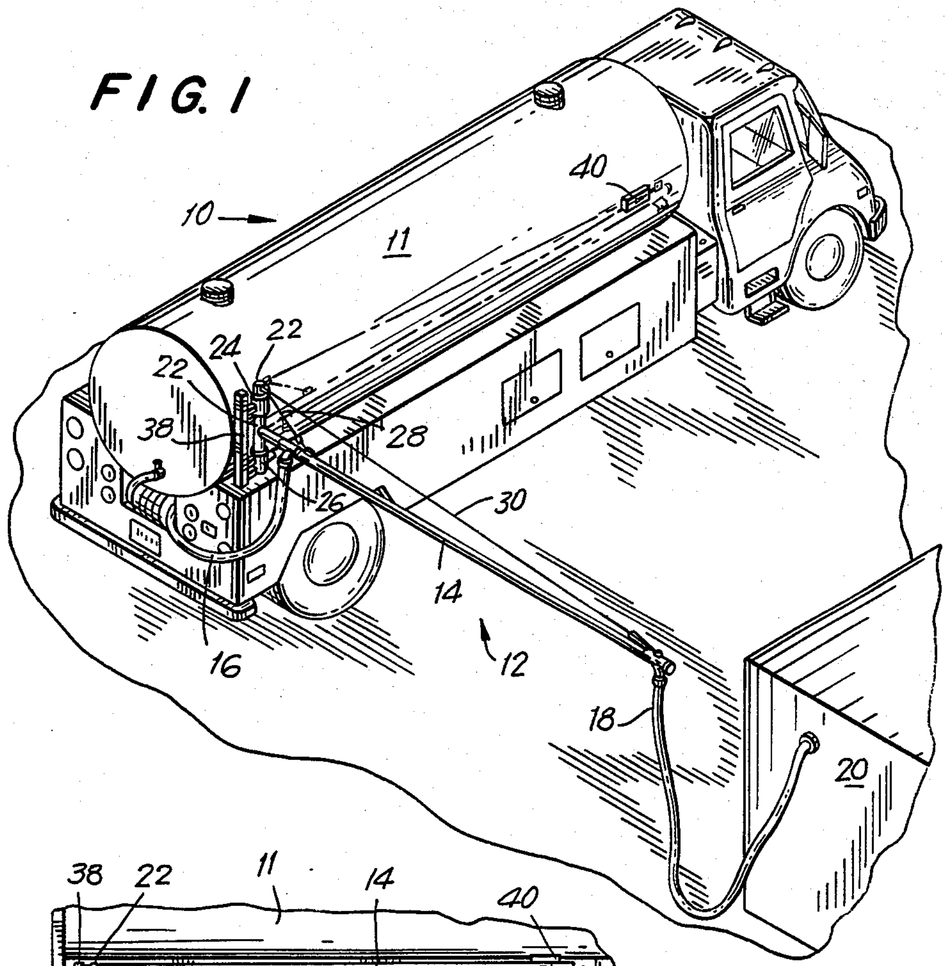
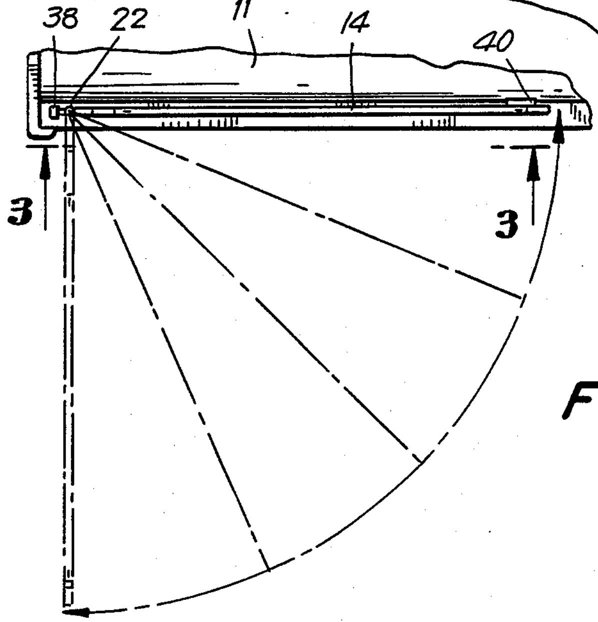
FIG. 2

PIVOTABLE OVERHEAD CONDUIT ASSEMBLY

TECHNICAL FIELD

The present invention relates generally to conduits for the transfer of a fluid medium between a first location and a second location and more particularly to a pivotable overhead conduit assembly for transferring fluids such as liquids and vapors between a motorized fluid storage vehicle and a second fixed location spaced a distance therefrom, such as the oil storage or boiler portion of a residential or commercial heating system.

BACKGROUND ART

A number of techniques have been disclosed in the prior art for transporting a fluid medium from one location to another. The means employed for this purpose normally include a supply tank to serve as an initial source of the material, a storage container or the like for receiving the flow from the supply tank and a conduit assembly for directing the fluid between the source of supply and the storage container.

Examples of some prior art fluid transport devices include, for example, U.S. Pat. No. 3,587,643 to Bahr, et al. which discloses an apparatus for loading or unloading liquid between a storage tank and a bulk liquid carrier. The apparatus has at least two conduit assemblies, each defining a separate conduit path, mounted in side-by-side spaced relationship and normally extending in a vertical plane. Each conduit assembly is formed from a series of connected flexible and rigid tubular sections which define a boom section that can be swiveled about a vertical axis and can be pivoted about a horizontal axis. The assemblies are normally vertically suspended and balanced so as to maintain flexible hose having an end fitting for attachment to the bulk carrier. They may be moved up or down by application of a small force thereupon and they may be swiveled relative to each other so as to cross over one another.

U.S. Pat. No. 4,388,948 to Carmanati, et al. describes an articulated fluid loading arm especially suited for transferring petroleum from a storage or loading terminal to a marine tanker and for returning vapor from the tanker to the terminal. The apparatus includes a support boom pivotably mounted on the deck of the terminal, a pair of fluid conduits extending along the boom from risers at the terminal and a dual flow-passage drop-pipe assembly suspended from an outboard end of the boom.

The drop-pipe assembly includes a pair of upper conduit members, a pair of lower conduit members and a pair of intermediate conduit members pivotably interconnected by a plurality of knee joints and swivel joints into a pair of articulated diamond-shaped structures. One set of upper, intermediate and lower conduit members comprises an assembly for the transfer of fluid from the terminal to the tanker, while the other set provides an assembly for the return of vapors from the tanker to the terminal. Additionally, a support cable extends from a tanker connection means on the lower end of the drop-pipe assembly to the outboard end of the boom and thereafter along the boom to a winch for lowering, raising and supporting the drop pipe assembly.

A different type of material transport apparatus, useful in transporting an air-entrained solid material, is described in U.S. Pat. No. 4,430,028 to Clayton, et al. The apparatus is a front-discharge nitrate delivery truck with an articulated boom. The boom is anchored about a pivot point which allows it to travel in a horizontal arc of at least 180°. A joint in the boom near the anchor point additionally enables the boom to be elevated in a substantially vertical arc. The boom elevation and orientation can be controlled by controls within the truck cab to locate the distal end of the boom at any ground position within a horizontal arc described by the distal end of the boom. The boom may further be folded alongside the truck for easy transport. The truck has its bed upon scales so that the truck operator may discharge a predetermined amount of prilled nitrate in a bore hole.

In addition, a number of other patent references generally disclose apparatuses for dispensing fluids or other material. These references include U.S. Pat. No. 4,202,372 to Gibbons for an Articulated Fluid Conduit with Auxiliary Support, describing an expandable and retractable fluid conduit for conveying fluid between a fixed point and a movable point; U.S. Pat. No. 3,605,824 to Madden, et al. for a Method and System for Loading Liquid Into a Container or the Like, which discloses an apparatus and method for transferring liquid into a container from a supply line, only when a vapor seal is formed between the supply line and the container; U.S. Pat. No. 2,953,161 to Muller for an Apparatus for Dispensing Liquid, which comprises a fixed column, an extensible pole or boom articulated or pivotably connected to the top of the column and moveable in all directions, and a filler tube or nozzle articulated or pivotably connected to the free end of the pole or boom and adapted to descend into a fuel tank through an orifice on the top of the latter or to receive a flexible conduit terminating in a tight coupling device for filling under pressure; and U.S. Pat. No. 2,250,227 to Kiel for a Device for Loading Gasoline Into Tank Trucks. This patent describes an improved counterbalance apparatus for a gasoline delivery pipe and a new design for a swing joint, whose rotary stem may be locked in the service position.

SUMMARY OF THE INVENTION

The invention disclosed herein is an overhead apparatus for transferring a fluid medium between a first moveable location and a second fixed location. The apparatus comprises a container for storing a fluid medium, a conduit assembly for selectively communicating the fluid storage container with a location spaced therefrom, and, adjacent to the container, a pivotal support is located for supporting at least a portion of the conduit assembly. The conduit assembly is thus supported at a location above ground level and provides selective fluid medium communication between the container and the location spaced therefrom, in order that the fluid medium may be transferred therebetween. This permits the unimpeded passage of traffic below the supported conduit. At least a portion of the conduit assembly may be pivotally rotated between a first storage position and a second operating position. The conduit assembly may be at least partially constructed of a flexible hose, supported by the pivotal support assembly.

The pivotal support assembly of the invention comprises at least one collar support mounted generally vertically to an upper portion of the container. A pivot arm, which is rotatably and slidably positioned within apertures defined by both collar supports, facilitates movement of the pivotally supported conduit assembly through a substantially horizontal arc of at least about 180°. In addition, a conduit having at least a partially unobstructed inner bore portion is coupled to and extends away from the pivot arm in a generally substantially horizontal orientation.

In an alternate embodiment of the invention, the apparatus comprises: a container for storing a fluid medium, a first fluid conduit assembly pivotally supported adjacent the container, a second fluid conduit for communicating the first, pivotally supported conduit with the fluid container and a third fluid conduit for selectively communicating the first, pivotally supported conduit with a location spaced from the fluid container. This apparatus provides selective fluid medium communication between the fluid container and a location spaced therefrom, such that the fluid medium may be transferred therebetween, while permitting an unimpeded flow of traffic under the first, supported conduit. Further, at least the first, supported conduit may be pivotally rotated between a first storage position and a second operating position. In the apparatus described above, the fluid container may be a motorized fluid storage vehicle such as an oil tank truck.

The pivotally supported first fluid conduit assembly described above may comprise at least one collar support mounted generally vertically to an upper side portion of the vehicle, a pivot arm which is rotatably and slidably positioned within an aperture defined by each collar support to facilitate movement of the pivotally supported conduit through a substantially horizontal arc of at least about 180°, and a conduit having at least a partially unobstructed inner bore portion coupled to and extending away from the pivot arm in a generally substantially horizontal orientation. The conduit may be further provided with inlet and outlet couplings at locations spaced apart along the length thereof.

In addition, at least one collar support may be provided with a locking apparatus to prevent unwanted rotation by the pivotally supported conduit assembly. This locking apparatus may be a locking pin or a set screw. Furthermore, a lowest one of the collar supports may be provided at a bottom portion thereof with seat means for supporting a bottom portion of the pivot arm. The pivot arm described above comprises a vertical pipe, the outer diameter of which is configured and adapted for passage through a bore defined by the collar supports for unobstructed rotation therewithin.

The pivotally supported conduit assembly may further comprise flanges located on both the pivot arm and on the conduit. Each flange defines at least one aperture for the attachment of at least one cable suport for connecting and supporting the pivot arm and conduit. In addition, each cable support may further comprise means for increasing the tension thereof, such as a turnbuckle. In this embodiment of the invention, the second and third fluid conduits are detachable flexible hoses attached to the inlet coupling and the outlet coupling, respectively, of the conduit portion of the first fluid conduit assembly. These flexible hoses are attached by coupling means, such as hose clamps, to the first fluid conduit assembly. The apparatus may further comprise a device for regulating the flow of the fluid medium through the conduits, such as a valve, which is preferably located between the fluid storage container and the second fluid conduit for optimal performance.

The first conduit assembly may optionally be provided with a removable cap at a terminal portion of the conduit furthest removed from the pivot arm, for use in flushing out the conduit when it becomes dirty or clogged with debris.

A third embodiment of the invention comprises a tanker truck for supplying a volume of a fluid medium and a first fluid conduit assembly, pivotably supported adjacent the tanker truck. The first conduit assembly comprises two collar supports mounted one above the other in a generally vertical line adjacent an upper side portion of the truck. At least one of the collar supports is provided with a set screw to prevent unwanted rotation of the first fluid conduit assembly.

The assembly additionally comprises a vertically pivotal pipe, rotatably and slidably positioned within an aperture defined by each of the collar supports, to facilitate the rotation of the first fluid conduit assembly through a substantially horizontal arc of at least about 180°, as well as a hollow conduit, constructed integral with and extending away from the vertically pivotal pipe in a generally horizontal orientation. The conduit may further be provided with a removable cap at a terminal portion furthest removed from the vertically pivotal pipe for use in flushing the conduit. The conduit is also provided with a hollow inlet nipple and a hollow outlet nipple projecting therefrom at locations spaced apart along the length of said conduit.

Both the vertically pivotal pipe and the conduit may be provided with a flange. Each flange defines at least two apertures for the attachment of at least two support cables connecting and supporting the vertically pivotal pipe and the conduit. The tension on each of these cables is adjustable by the use of a turnbuckle device.

The apparatus of this embodiment additionally includes a second fluid conduit comprising a flexible hose for communicating the pivotally supported conduit assembly with the tanker truck and a third fluid conduit comprising a flexible hose for selectively communicating the pivotally supported conduit assembly with a location such as an oil supply tank which is spaced from the tanker truck. This apparatus provides selective fluid medium communication between the tanker truck and the supply tank spaced therefrom, while permitting a fluid medium to be transferred therebetween. An unimpeded flow of traffic may pass thereunder because the supported conduit assembly is raised for enough above ground level to permit such passage. At least the first conduit may be pivotally rotated between a first storage position and a second operating position. This embodiment of the invention may further include valve means positioned between the tanker truck and the pivotally supported conduit for regulating the flow of fluid therethrough.

BRIEF DESCRIPTION OF THE DRAWINGS

FIG. 1 is a perspective view of applicants' pivotable overhead conduit assembly mounted upon a motorized vehicle equipped with a fluid container;

FIG. 2 is a partial plan view of applicants' pivotable conduit apparatus, illustrating a portion of the horizontal arc through which the apparatus may move;

DETAILED DESCRIPTION OF THE PREFERRED EMBODIMENTS

Figure 3:
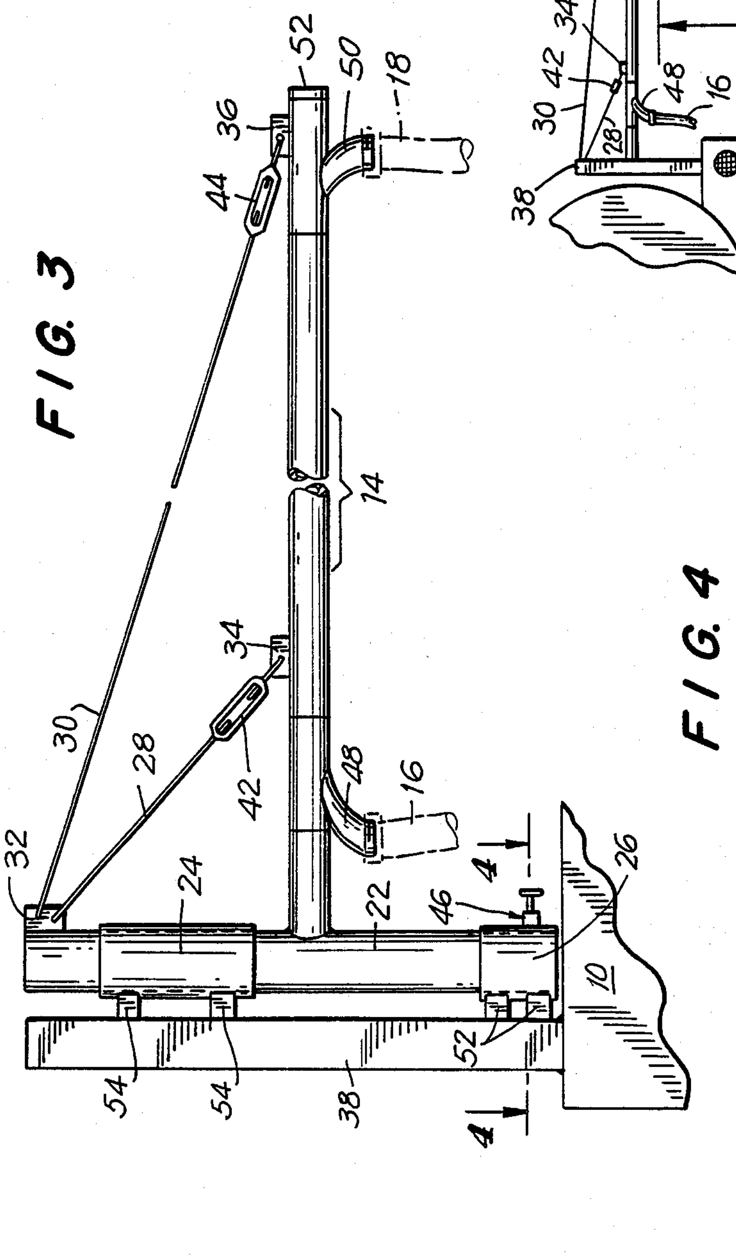
FIG. 3 is a front view, along line 3—3 of FIG. 2, of applicants' pivotable conduit apparatus illustrating the various features thereof.

Referring initially to FIG. 1 there is illustrated tanker truck 10. Mounted upon a body portion of truck 10, adjacent fluid container tank 11, is applicants' pivotable overhead conduit assembly 12. Assembly 12 is formed of a first fluid conduit 14 pivotally supported adjacent tank portion 11 of truck 10, a second conduit 16 for communicating conduit 14 with tank 11 and a third conduit 18 for communicating conduit 14 with a location 20 spaced a distance from truck 10. Location 20 may, for example, be a boiler portion of a residential or commercial heating system from which excess soot, produced as a result of fossil fuel combustion, is to be removed. This may be done with the use of a suction apparatus (not shown) attached to truck 10 and operating to draw the soot from boiler 20, through conduits 18, 14, 16 respectively and into tank 11 for subsequent disposal.

Preferably however, tanker truck 10 is utilized to deliver fuel oil to storage tanks located upon the aforesaid commercial and residential premises. The oil is thus pumped out of the container means, i.e., tank 11 and through conduits 16, 14, 18, respectively. The oil thereafter flows into storage tank 20 where it remains until it is utilized in the boiler portion of the heating system.

In either of the applications discussed above, tanker truck 10 must frequently be parked at a location a distance removed from the establishment to be serviced, such as when there is no driveway at that location and the driver must park at curbside, or in instances where no curbside parking is available and the driver must double-park in the street. This, of course, increases the distance between the truck and the business or residence to which the delivery is to be made.

The most commonly utilized prior art method for bridging the gap between tank 11 located on tanker truck 10 and storage tank 20 is a flexible rubber hose which extends from tank 11, along the ground to a coupling located on an exterior wall of the business or residence to be serviced. The hose must thus be passed over or under any automobile parked at curbside in front of the building in question and thereafter along the sidewalk to the coupling in front of or alongside the locations where the delivery is to be made. This procedure seriously impedes the flow of both vehicular and pedestrian traffic in the immediate area and creates a hazardous condition wherein an unwary pedestrian may trip over the hose and suffer serious injury as a result thereof.

Applicant's pivotable overhead conduit assembly 12 now overcomes the drawbacks of the previously utilized technique described above. With further reference to FIG. 1, first conduit 14 is preferably formed from a rigid or semi-rigid material such as hollow metal pipe or an extruded thermoplastic resin, e.g., polyvinyl chloride (PVC).

A flexible conduit material, such as a hose formed from a bendable elastomeric or engineering plastic base, may also be utilized in assembly 12 if it is supported in a horizontal plane above ground level at a height sufficient to allow a flow of vehicular and/or pedestrian traffic to move below the conduit without any impedence therefrom.

It is, in addition, particularly preferred that second conduit 16 and third conduit 18 be formed from flexible materials, such as rubber hoses for example. This enables these conduits to bend or twist as necessary to facilitate the transfer of the fluid medium from tank 11 to the supply tank as first conduit 14 is pivoted through a horizontal arc of approximately 180° from a storage position (shown in phantom) along the side of the truck to an operating position located at a point along the arc. The flow of the fluid through assembly 12 may be controlled by a valve (not shown) preferably located between truck 10 and second conduit 16.

With regard to the means for pivoting overhead conduit assembly 12, first conduit 14 may be coupled to and is preferably formed integrally with pivot arm 22. Arm 22 is vertically mounted through collar support members 24, 26, wherein each such member defines an open bore adjacent tank portion 11 of tanker truck 10. Collar members 24, 26 may be attached directly to truck 10 or they may be coupled to support bar 38 which is preferably welded to the body of the truck, as shown in FIG. 1. In order to provide an additional support for conduit 14, cable support means 28, 30, extend from a flange 32 (shown in FIG. 3) located upon an upper portion of pivot arm 22 to flanges 34, 36 (shown in FIG. 3) located proximately and distally, respectively, upon conduit 14 in relation to tank portion 11 of truck 10.

Additionally, in the preferred embodiment of the invention, tank 11 is provided with means 40 for securing the terminal portion, i.e., that portion closest to third fluid conduit 18, of conduit 14 against the side of truck 10. This securing apparatus 40 may be, for example, a locking bracket, a magnetic coupling device or any other means by which assembly 12 may be retained in a parallel storage position along the side of tank 11 while not in use.

Turning now to FIG. 2 there is illustrated in schematic fashion a portion of the arc through which apparatus 12 may be pivoted. While apparatus 12 is capable of operation along any point in a horizontal arc measuring about 180°, in the preferred application the rear portion of tanker truck 10 is positioned as nearly opposite the coupling for the oil storage tank as is feasible and assembly 12 is pivoted to an angle of approximately 90° so as to direct the flow of oil from tank 11 into storage tank 20 or to remove soot from a boiler by sucking it out of the boiler and into tank 11. Once the transfer of the fluid is complete, assembly 12 is pivoted back to its storage location alongside tank 11 and secured in position with apparatus 40, thus allowing the truck to proceed to the next stop on its itinerary.

FIG. 3 is a close-up view of the major components of assembly 12 along line 3—3 of FIG. 2. Since FIG. 3 depicts many of the same features of the invention that are illustrated in FIG. 1, the same numerals have been used to identify these features in both drawing figures. As discussed with relation to FIG. 1 therefore, apparatus 12 comprises first pivotal conduit 14 formed integrally with pivot arm 22, which arm is vertically supported adjacent tank portion 11 of tanker truck 10 by collar support members 24, 26. Members 24, 26 are attached to support bar 38, i.e., lower collar support member 26 is coupled to bar 38 by members 52 while upper collar support member 24 is attached by members 54. Providing additional support for conduit 14 are cable supports 28, 30 extending from bracket 32 located upon an upper portion of pivot arm 22 to brackets 34 and 36 respectively, located on the surface of first, supported conduit 14. Each cable support 28 and 30 is provided with means for tightening the support when necessary, such as turnbuckles 42, 44.

Figure 4:
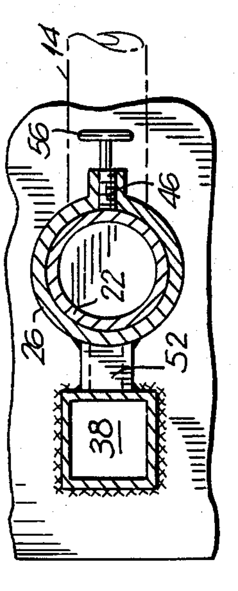
FIG. 4 is a sectional plan view, along line 4—4 of FIG. 3, illustrating one embodiment of a locking mechanism for maintaining the conduit apparatus of the invention in a preset position.

Furthermore, lower collar support member 26 is provided with a locking device such as set screw 46 which is illustrated in further detail in FIG. 4. Set screw 46 permits apparatus 12 to be locked into position, either when conduit 14 is aligned alongside tank 11 in its first storage position or when it is pivoted therefrom in a horizontal arc to a second operating position of about 90°, or at any position along the arc of about 180° which is achievable as a result of swinging pivot arm 22 within collar supports 24, 26. Alternate means for locking the apparatus, such as lock pins, are well known to those of ordinary skill in the art.

Protruding a distance apart from a lower surface of conduit 14 are inlet coupling 48 and outlet coupling 50. The function of these couplings may, of course, be reversed in the event that the apparatus of the invention is utilized as described above to remove a fluid medium such as fuel oil or gas-entrained soot from a heating system located a distance removed from truck 10 by pumping it through assembly 12 for subsequent transport to a disposal location. Couplings 48, 50 are utilized to attach conduits 16 and 18, respectively, to conduit 14.

As previously discussed, therefore, conduit 16 communicates conduit 14 with tank 11 while conduit 18 communicates conduit 14 with a location 20 spaced a distance from tanker truck 10. In addition, conduit 14 may be provided with cap 52 which is preferably screwed onto a terminal portion thereof, i.e., that portion furtherest removed from pivot arm 22. Cap 52 may be removed when necessary to clean assembly 12. This normally entails removing clogs and/or debris from conduit 14. Through these linked conduits therefore, a fluid medium may pass in either direction between truck 10 and a location 20 remote therefrom.

FIG. 4 is a sectional plan view of locking mechanism 46 through line 4—4 of FIG. 3. This view illustrates how lower collar support member 26 is attached for stability to support bar 38 by members 52, preferably by welding these parts together. Collar member 26 concentrically supports pivot arm 22, which may rotate within the aperture defined by member 26 until handle 56 of set screw 46 is turned to tighten the screw against the outer surface of arm 22 at a desired position. This prevents the rotation of apparatus 12. While other means may be used to lock conduit assembly 12 into position, set screw 46 is the simplest and easiest to use, and is therefore preferred for use in the invention.

Figure 5:
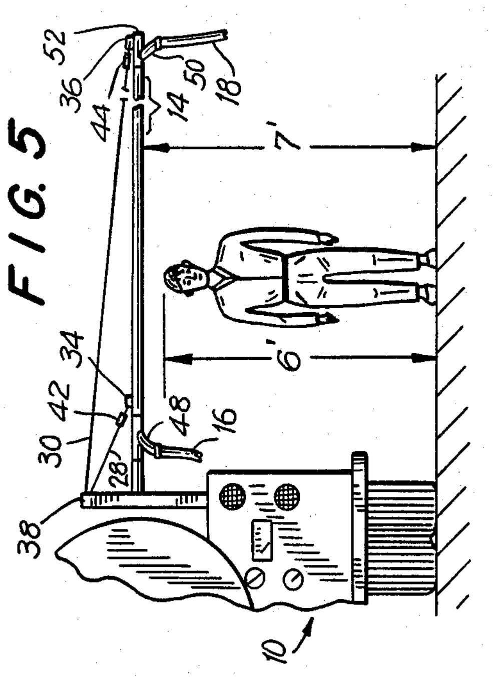
FIG. 5 is a side view of applicants, pivotable conduit apparatus illustrating the passage of pedestrian and optionally, vehicular traffic thereunder while the apparatus is in operation.

Turning now to FIG. 5, conduit apparatus 12 is depicted therein as being pivoted into an operating position so as to extend conduit 14 in an elevated, i.e., above ground level, horizontal plane across the sidewalk or across a line of doubleparked automobiles. In this position, apparatus 12 does not impede or interfere with the flow of pedestrian or vehicular traffic thereunder while the apparatus is in operation. An important aspect of the invention, therefore, is that apparatus 12 be located upon an upper portion of truck 10 which is far enough above ground level, e.g., at least 7 feet as shown in FIG. 5, to permit such unimpeded passage.

For this purpose, the angle at which conduit 14 intersects pivot arm 22 may be slightly, upwardly varied from the perpendicular orientation depicted in the drawing figures. This serves to tilt conduit assembly 12 in slightly upward direction. However, this angle should not be of a measurement such that the tip of conduit 14 extends higher than the upper surface of tank 11 since, first, more energy is required to pump a fluid medium up a steep incline and this requirement would create the need for larger, more expensive pumping equipment, and second, if the tip of conduit 14 extends too far above tank 11, it may become caught upon tree branches or power lines as the vehicle travels from one location to another, thus damaging the equipment.

An alternate embodiment of the present invention, not depicted in the drawing figures, entails the use of a single flexible conduit, such as a rubber hose, communicating fluid container 11 with a location 20 spaced therefrom. The rubber hose may be coupled to a motorized vehicle adapted and modified to carry and store fluid materials. A length of the hose may either be supported within a hollow bore of the pivoted support means described above, or it may be attached in some manner to the surface of the pivoted support, which permits the conduit to be horizontally pivoted at a height sufficiently above ground level to permit the unimpeded passage of traffic therebelow.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

We claim:

1. A pivotable overhead conduit apparatus for transferring a fluid medium between a first moveable location and a second fixed location which comprises:

(a) a tanker truck for containing a volume of a fluid medium;

(b) first fluid conduit means, pivotably supported adjacent said tanker truck, said first conduit means comprising:

(i) two collar support means mounted one above the other in a generally vertical line adjacent an upper side portion of said truck, wherein at least one said collar support is provided with a set screw to prevent unwanted rotation of said first fluid conduit means, (ii) a vertically pivotal pipe rotatably slidably positioned within an aperture defined by each said collar supports to facilitate the rotation of said first fluid conduit means through a substantially horizontal arc of at least about 180°, and (iii) a hollow conduit constructed integral with and extending away from said vertically pivotal pipe in a generally horizontal orientation wherein said conduit is provided with a removable cap at a terminal portion furthest removed from said vertically pivotal pipe for use in flushing said conduit and said conduit is further provided with a hollow inlet nipple and a hollow outlet nipple projecting therefrom at locations spaced apart along the length of said conduit, wherein both said vertically pivotal pipe and said conduit further comprise flange means, and wherein each said flange means defines at least two apertures for the attachment of at least two support cables connecting and supporting said vertically pivotal pipe and said conduit and further wherein the tension on each of said at least two cables is adjustable by the use of a turnbuckle; and (c) second fluid conduit means comprising a flexible hose for communicating said pivotally supported conduit means with said tanker truck;

(d) third fluid conduit means comprising a flexible hose for selectively communicating said pivotally supported conduit means with a location spaced from said tanker truck to provide selective fluid medium communication between said tanker truck and said location spaced therefrom such that a fluid medium may be transferred therebetween, while permitting an unimpeded flow of traffic thereunder, whereby at least said first conduit may be pivotally rotated between a first storage position and a second operating position, and (e) valve means positioned between said tanker truck and said pivotally supported conduit means for regulating the flow of said fluid medium therethrough.

2. An overhead conduit apparatus for transferring a fluid medium between a first movable location and a second fixed location, which comprises:

(a) a fluid medium storage vehicle containing means defining an inner containing portion for containing the fluid medium;

(b) a vertical elongated member pivotably mounted adjacent said vehicle and said containing means;

(c) a rigid conduit member mounted to said vertical pivotable member and extending generally outwardly therefrom such that rotation of said pivotable member causes said conduit member to sweep an arcuate path in a horizontal plane when said vehicle is positioned in a vertical upright position, said arcuate path including at least one position for said conduit means adjacent said vehicle for storage of said conduit means and at least a second position extending away from said vehicle for transferring the fluid medium therewithin between a fixed location distal from said vehicle and said containing means;

(d) first flexible conduit means connected at one end to a first end portion of said horizontal conduit closest to said vehicle in sealed communication therewith and at the other end to the containing means of said vehicle for communication with the inner medium containing portion of said containing means;

(e) second flexible conduit means connected to a second end portion of said horizontal conduit means furtherest removed from said vehicle in sealed communication therewith, such that a free end portion of said second flexible conduit means may be selectively disposed in connection with said second fixed location, said first and second flexible conduits and said rigid horizontal pivotal conduit providing movable and continuous communication between said containing means and said fixed location for transferring a fluid medium therebetween; and (f) means to selectively fix the position of said vertical pivotable member and thereby said horizontal conduit member in one of a plurality of horizontal positions within the horizontal arcuate path of said horizontal conduit member.

3. The apparatus of claim 2 wherein said rigid conduit member extends substantially perpendicularly from said vertical pivotable member.

4. The apparatus of claim 3 which further comprises means to facilitate selective communication with an interior portion of said rigid, horizontally mounted conduit member to facilitate cleaning of said interior portion thereof.

5. The apparatus of claim 4 wherein said means for selective communication is a removable cap member located at a terminal portion of said horizontally mounted conduit member furtherest removed from said vertical elongated member.

6. The apparatus of claim 2 which further comprises valve means positioned between said first flexible conduit means and said containing means, said valve means adapted for selectively regulating a flow of said fluid medium therethrough.

7. A manually pivotable overhead conduit apparatus for transferring a fluid medium between a first movable location and a second fixed location, which comprises:

(a) a fluid storage vehicle for containing a quantity of a fluid medium;

(b) first fluid conduit means supported for pivotal movement adjacent said fluid storage vehicle, said first conduit means comprising:

(i) at least one collar means for supporting a vertically pivotable elongated member, said collar support means mounted generally vertically to an upper portion of said fluid storage vehicle;

(ii) a vertically, pivotable elongated member rotatably, slideably positioned within an aperture defined by each said collar support means to facilitate rotation of said first fluid conduit means through a substantially horizontal arc of at least about 180°; and (iii) tube means having an at least partially unobstructed inner bore portion, said tube means rotatably associated with and extending in a direction away from said pivotable elongated member and having a substantially horizontal orientation, wherein said tube means is provided with means for opertively connecting second and third fluid conduit means thereto and wherein both said pivotable elongated member and said tube means further comprise flange means configured for the attachment of adjustable means for supporting said first conduit means; and (c) second fluid conduit means operatively associated with said first conduit means for communicating said pivotally supported first conduit means with said fluid storage vehicle; and (d) third fluid conduit means operatively associated with said first conduit means for selectively communicating said pivotally supported first conduit means with a location spaced from said fluid storage vehicle such that a fluid medium may be transferred therebetween while permitting an unimpeded flow of traffic thereunder, said first conduit means being pivotally rotatable between a first storage position along a side portion of said fluid storage vehicle and a second operating position.

8. The appratus of claim 7 wherein said pivot arm comprises a vertical pipe, the outer diameter of which is configured and adapted for passage through each said collar support means and for unobstructed rotation therewithin.

9. The apprtus of claim 7 wherein said adjustable support means comprises at least one flexible cable means extending between said elongated member and said first conduit means and adapted for the support of said first conduit means.

10. The apparatus of claim 9 wherein each said cable support means further comprises means for increasing the tension thereof.

11. The apparatus of claim 10 wherein said tension increasing means is a turnbuckle.

12. The apparatus of claim 7 wherein said second and said third fluid conduit means are detachable flexible hoses attached to said inlet means and said outlet means respectively of the conduit portion of said first fluid conduit means.

13. The apparatus of claim 12 wherein said flexible hoses are attached to said first fluid conduit means by coupling means.

14. The apparatus of claim 13 wherein said coupling means are hose clamps.

15. The apparatus of claim 7 which further comprises means for regulating the flow of said fluid medium through said conduit means.

16. The apparatus of claim 15 wherein said flow-regulating means is valve means.

17. The apparatus of claim 7 wherein said tube means is constructed integral with said pivotable elongated member.

18. The apparatus of claim 7 wherein said tube means is coupled to and rotates around an exterior portion of said pivotable elongated member.

19. The apparatus of claim 7 wherein said at least one collar support means is provided with locking means to prevent unwanted rotation by said pivotally supported conduit means.

20. The apparatus of claim 19 wherein said locking means is a locking pin or a set screw.

21. The apparatus of claim 7 wherein a lowest one of said at least one collar support means is provided at a bottom portion thereof with seat means for supporting a bottom portion of said pivot arm.

* * * * *